United States Patent Office 3,123,574
Patented Mar. 3, 1964

3,123,574
PALLADIUM SUPPORTED CATALYST MODIFIED BY VARIOUS METALS
Mykola Zajcew, Newark, N.J., assignor, by mesne assignments, to Engelhard Industries, Inc., Newark, N.J., a corporation of Delaware
No Drawing. Filed Mar. 31, 1958, Ser. No. 724,823
5 Claims. (Cl. 252—447)

This invention relates to an improved method for the selective hydrogenation of fatty oils. In particular, this invention provides an improved method for the selective hydrogenation of unsaturated fatty acids as castor oil containing hydroxyl groups, and for the selective hydrogenation of unsaturated fatty oils containing three, two, and one olefinic linkages. Selective hydrogenation of the castor oil gives a valuable product known as "castor wax," and selective hydrogenation of oils containing multiple olefinic linkages is the crux of the production of margarine and shortening. This invention relates especially to improved catalysts of palladium which have been modified by the addition of one or more other metals so as to give catalysts showing a very high order of selectivity. Although these catalysts were designed for use with unsaturated glycerides, they may be used with other unsaturated esters and with unsaturated free acids as well.

Hydrogenated castor oil is a valuable product, having wide and diverse industrial use, and about six million pounds are produced annually in the United States. It enjoys wide popularity as the result of a number of desirable properties, including hardness, low solubility in organic solvents, non-toxicity, oxidation stability, and high dielectric constants, i.e., 12 at 30° C. and 22 at 60° C. for 100 cycles. These desirable properties of hydrogenated castor oil are obtained only if the hydrogenation of the oil is selectively performed, i.e., most of the olefinic linkages are reduced without appreciable hydrogenolysis of the hydroxyl function.

Castor oil contains glycerides of ricinoleic acid, 85–87 percent, oleic acid, 6–8 percent, linoleic acid, 3–5 percent, saturated acids 2.5–3 percent, and a small amount of dihydroxystearic acid, 0.5–2 percent. A saturated hydrogenated castor oil has an iodine value of 2.5–8.5, a melting point of 85–86° C., a hydroxyl value of 145–160, and an acid value less than 2. Thus, in the hydrogenation of castor oil the iodine value must be reduced by about 90 to 97 percent, while the hydroxyl value may be reduced by only about 9 percent. Catalysts for this hydrogenation are, therefore, necessarily limited to those having an adequate selectivity.

Nickel catalysts have been used most widely in industry for the hydrogenation of castor oil and, generally, hydrogenations using nickel catalysts are performed under high pressures in the range of 15 to 150 atmospheres, and temperatures in the range of 160–170° C. Higher temperatures are avoided in order to minimize dehydroxylation, but the use of temperatures as high as 260° C., at a pressure of 110 atmospheres, has been reported to produce little loss of hydroxyl function when a copper catalyst is used.

In accordance with the present invention, palladium catalysts are provided for the hydrogenation of castor oil and other fatty oils. Hydrogenations performed using palladium result in certain advantages not found when other catalysts are employed. Palladium is an extremely active catalyst, and satisfactory hydrogenations may be performed rapidly, using small quantities of catalysts at room temperatures and pressures. The use of low temperatures and pressures permits the use of inexpensive equipment, and the rapid reaction possible with palladium, results in a high space-time yield of product from such equipment. In addition, the mild operating conditions possible using palladium catalysts limits the undesirable side reactions occurring when more extreme conditions are required. The palladium catalyst may be used repeatedly, and the catalyst may be filtered from each finished batch and recharged to the next succeeding batch, when a batchwise process is employed. Or, of course, the catalyst may be used in a continuous process. When the catalyst is finally spent, the palladium metal may be recovered, reworked and made into new catalyst. Thus, since palladium can be used repeatedly and finally reclaimed, it frequently proves more economical than metals which sell at a much cheaper price per pound, such as nickel for example.

It is important that a catalyst used in the hydrogenation of fatty oils for shortening stock and margarine oil, display high selectivity, i.e., fats containing three double bonds should be hydrogenated before those containing two, and those, in turn, before the fats containing one double bond.

The catalysts of the present invention are particularly useful for the hydrogenation of shortening stocks, since these catalysts produce fewer trans isomers than do other catalysts. Unsaturated fats occur in nature almost entirely as the cis isomers, but during the usual hydrogenations, many of these olefins that are not reduced are converted to trans isomers, which is an undesired side reaction. Trans isomers, in general, have higher melting points than do cis isomers, and the presence of trans isomers in shortening, has a deleterious effect on the product. It is necessary that shortening have a wide plastic range, i.e., that it be plastic at refrigerator temperatures and has some "body" at about 40° C.; shortening will not be plastic if it contains appreciable quantities of trans isomers. Although margarine oils used for the preparation of margarine may have a high content of trans isomers, excessive quantities thereof, which form at the high temperatures of margarine oil processing, result in high melting point hydrogenated oils, and these melting points should not be higher than the temperature of the human body, i.e., about 36° C. The use of improved palladium catalysts, lowers this temperature to the desired range. (See Table II.)

The catalyst used in accordance with the present invention is palladium modified by the addition of another metal compound such as a compound of mercury, silver, bismuth or copper. The catalyst may be prepared by precipitation or absorption, i.e., the metals may be co-precipitated, or one metal may be precipitated after the other metal is already on a support. The metals may also be absorbed together, or one metal may be absorbed after the other is on the catalyst support.

For example, a stirred suspension of water and palladium metal, on a support such as carbon, may be prepared, and to this mixture may be added a soluble compound of mercury, silver, bismuth or copper, or mixtures thereof, such as soluble compounds of bismuth and silver, slowly while stirring. The mixture is then heated to a temperature in the range of about 50–90° C., and after the addition is complete, the mixture is stirred while hot for another interval of about 5 minutes to one hour, after which the solids are separated, washed and dried.

A second method of preparing the catalyst is to suspend a catalyst support in water and add a solution of a compound of palladium and one or more solutions of modifying compounds, such as mercuric chloride for example. A precipitating agent is then added, such as sodium formate, and stirring of the solution at a temperature in the range of 50–90° C. is continued. The hot solution is then filtered, washed and the precipitate is dried.

In both of the foregoing procedures, the catalyst consists of palladium on a support, modified by a compound of mercury, silver, bismuth or copper, or an organo complex involving one of these metals.

In the preparation of the novel catalyst of the invention, the palladium may be present on the support in an amount of about .001 to 10 percent by weight of the total catalyst, i.e., including the support, preferably .01 to 1 percent by weight, and the compound of the modifying metal may be either precipitated or absorbed on the supported palladium catalyst in a quantity in the range of about .0005 to 10 percent of the total catalyst weight, preferably 0.005 to 1.0 percent by weight. When preparing the catalyst by precipitation of the modifying metal compounds onto the supported palladium catalyst, the temperature of the mixture of catalyst and soluble modifying metal compounds, should be in the range of about 20 to 100° C., preferably 70 to 90° C., and this mixture should be heated for a period of 0.3 to 2 hours. When co-precipitating palladium from a solution thereof onto a carrier, together with the compound of the modifying metal, the temperature of the suspension should be in the range of 20 to 100° C., preferably 70 to 90° C., and the suspension should be heated for a period of 0.5 to 2 hours.

Among the catalyst supports which may be used to prepare the catalyst of the present invention, are carbon, alumina, including activated alumina, silica gel, kieselguhr, asbestos, and the like, but carbon is the preferred support for a number of reasons, including ease of recovery of the catalytic metal.

The catalysts may be granular, extruded, or pelleted if used as stationary catalysts, as in a continuous process, or preferably powdered if used in batch processes.

In the hydrogenation of fatty oils, the hydrogenations may be performed in an ordinary hydrogenator, in which hydrogen is added in the conventional manner, i.e., it may be pressured in over the oil, or bubbled up through the oil. Hydrogenations performed using the catalyst of the present invention generally are performed using a temperature in the range of about 40 to 200° C., hydrogenation time in the range of about 30 to 600 minutes, a pressure in the range of atmospheric to about 1,000 p.s.i.g., preferably atmospheric to about 100 p.s.i.g., and using a catalytic metal concentration, based upon the weight of oil hydrogenated, in the range of about 0.00005 to 0.1 percent.

The invention will be further illustrated by reference to the following specific examples:

EXAMPLE I 3.75 grams of basic bismuth acetate were boiled in 300 ml. of glacial acetic acid, and evaporated to 200 ml. of clear solution. 8.13 grams of silver acetate were boiled in 800–900 ml. of 1 percent by weight acetic acid and these two solutions were combined and diluted to a volume of about 1.5 liters with water. The combined solutions were then added slowly, over a period of 30 minutes, to 1500 grams of a 1 percent by weight, palladium on carbon catalyst (carbon particle size=10–100 microns), vigorously stirred in 15 liters of water. 25 grams of sodium formate, dissolved in 100 ml. of water were added dropwise. The resulting solution was heated to boiling, and maintained close to boiling temperature for a period of 20 minutes. After settling, the solution was decanted, and the catalyst was filtered, washed and dried at a temperature of 100° C. (Ratio Pd:Ag:BiOAc=1:0.35:0.25.) The dried catalyst assayed (weight basis): Pd=0.99 percent, Ag=0.32 percent, and Bi=0.36 percent.

EXAMPLE II 1 kilogram of a catalyst consisting of 1 percent by weight, palladium metal supported on carbon powder (carbon particle size=10–100 microns), was mixed with 3 liters of water, and to this mixture was added a solution of 5.45 grams of silver acetate in 250 ml. of water, and 2.5 grams of basic bismuth acetate in 250 ml. of 5 percent by weight, acetic acid. The addition was made slowly, with stirring, and the mixture was maintained at a temperature of 85–90° C. during the addition, which required about one hour. After the addition was complete, the mixture was stirred at a temperature of 90° C. for an additional half-hour period. The mixture was then filtered, and the solids were washed with water, and dried at a temperature of 90–95° C. (Ratio Pd:Ag:BiOAc=1:0.35:0.25.)

EXAMPLE III 1 kilogram of a catalyst consisting of 0.1 percent by weight, palladium on granular alumina (8–14 mesh), was mixed with 2 liters of water. Solutions consisting of 1.548 grams of silver acetate (equivalent to 1 gram of silver) in 250 ml. of water and 0.7 gram of bismuth subacetate in 100 ml. of 5 percent acetic acid, were then added slowly to the palladium catalyst, and the mixture was heated to a temperature of 85–95° C. A solution of 5 grams of sodium formate dissolved in 100 ml. of water, was then slowly added, and after the addition was complete, the mixture was heated for an additional half-hour, filtered, and the solids were washed with water, and dried at a temperature of 90–95° C. (Ratio Pd:Ag:BiOAc=1:1:0.7.) The dried catalyst assayed (weight basis): Pd=0.09 percent, Ag=0.11 percent, and Bi=0.09 percent. This catalyst is particularly useful in continuous hydrogenation processes.

EXAMPLE IV

A suspension of 99 grams of charcoal (carbon particle size=10–100 microns), and 75 grams of sodium carbonate, and 3 liters of water, was heated to a temperature of 50–60° C. A solution containing $Na_2PdCl_4$ (1 gram palladium) and a solution containing 1 gram of $HgCl_2$, were added, dropwise, while stirring, to the charcoal suspension. After the addition was complete, the solution was stirred for another hour, and then 150 ml. of a 10 percent sodium formate solution were added, and stirring was continued for an additional hour. The hot solution was filtered, and the solids were washed with water, and dried at a temperature of 85° C. (Ratio Pd:$HgCl_2$=1:1.)

EXAMPLE V 1 kilogram of a 1 percent palladium on carbon powder catalyst (carbon particle size=10–100 microns), was suspended in 3 liters of water. To this suspension was added, while stirring, 1 liter of a copper acetate solution containing 50 grams of copper. After stirring for a period of 0.5 hour, one equivalent of sodium hydroxide was added, and the mixture was heated, while stirring, to a temperature of 90° C. for a period of 0.5 hour. The mixture was then filtered, and the solids were washed with water, and dried at a temperature of 90° C. (Ratio Pd:Cu=1:5.)

EXAMPLE VI

A number of hydrogenations were performed in which a stainless steel hydrogenator was successively charged with a 3-pound charge of castor oil. The hydrogenations were performed using intensive agitation, and at the temperatures and times indicated in the Table I below. It was found that selectivity was not affected by changing the rate of agitation, but the reaction rate increased appreciably with increasing agitation. Processing was controlled by a rapid melting point determination of the product (modified A.O.C.S. method Cc–3–25; 10 minutes on the ice). Castor oil, non-selectively hydrogenated, is primarily glycerides of stearic acid having a melting point of about 70° C. Iodine values were determined at a constant temperature of 24° C., using Hanus' method. Determination of capillary melting points, hydroxyl numbers and acidities, was made according to the official method of the American Oil Chemists' Society. The conditions employed in the hydrogenations and the experimental results are summarized in Table I below.

Using an unmodified 5 percent by weight, palladium on charcoal catalyst, A, a satisfactory product could not be obtained. This catalyst was non-selective, and hydroxyl groups were too rapidly reduced concurrently with the olefin. A 1 percent by weight, palladium on charcoal catalyst, B, gave a more, although not completely, satisfactory product. The catalyst produced a castor wax having a maximum melting point of 83.5° C. and a maximum hydroxyl value of 135.5 (note Experiment 6).

An entirely satisfactory product was obtained using catalyst, C, which is the catalyst prepared in accordance with the procedure of Example I above. The products obtained in Experiments 9 and 10 were good, high-quality castor wax. There was no increase in the acidity value, thereby indicating the absence of side reactions, such as hydrolysis, estolide formation, and etherification. The selectivity of this catalyst is apparent from Experiment 3, in which in 60 minutes of processing, the iodine value decreased 25 percent, but the hydroxyl number was unand the results obtained are listed. Each of the catalysts was supported on carbon having a particle size of 10–100 microns.

Catalyst No. 1 in Table II is a commercial palladium on carbon catalyst. The preparation of catalyst No. 2 is disclosed in Example IV above. The preparation of catalyst No. 3 is identical with the preparation disclosed in Example II above, except that the bismuth compound is omitted. The preparation of catalyst No. 4 is identical with that disclosed in Example II above, except that the silver compound is omitted. The preparation of catalyst No. 5 is disclosed in Example V above, and the method of preparation of catalyst No. 6 is disclosed in Example II above.

Catalyst No. 7 is a commercial palladium on carbon catalyst. Catalyst No. 8 is the same as No. 6, except that less basic bismuth acetate was added.

In Table III, catalyst No. 9 is a commercial palladium catalyst identical with catalyst Nos. 1 and 7 of Table II. Catalyst No. 10 is identical with catalyst No. 6. Catalyst No. 11 is prepared in the same way as No. 6, except that less bismuth and silver compounds were used.

*Table I*

HYDROGENATION OF CASTOR OIL

| Experiment | T, °C. | Pressure, p.s.i.g. | Agitation, r.p.m. | Catalyst | Percent Pd in Oil | Time, min. | Hydrogenated Castor Oil | | | |
|---|---|---|---|---|---|---|---|---|---|---|
| | | | | | | | I.N. | Capil., M.P. | OH, # | Acid Val. |
| 1 | a 30–60 | | | A | 0.1 | 160 | 3.7 | 83 | 126 | |
| 2 | 100 | 50 | 420 | A | 0.1 | b 100 | 25 | 56 | 110 | |
| | | | | | | b 200 | 3.5 | 70 | 95.2 | |
| 3 | 112–115 | 30 | 800 | C | 0.01 | b 120 | 7.3 | 85.5 | 138.6 | |
| | | | | | | b 180 | 5.5 | 85.7 | 138.8 | |
| 4 | 122–125 | 40 | 800 | B | 0.002 | 180 | 5.4 | 82.3 | 128.5 | |
| 5 | 122–125 | 40 | 620 | B | 0.001 | 330 | 34.6 | 71 | 123 | |
| 6 | 86–90 | 30 | 620 | B | 0.004 | 285 | 5.6 | 83.5 | 135.5 | |
| 7 | 86–90 | 40 | 620 | C | 0.005 | 440 | 12 | 83 | 136.5 | |
| 8 | 92–95 | 40 | 620 | B | 0.005 | 275 | 2.8 | 82.5 | 129.7 | |
| 9 | 96–100 | 45 | 620 | C | 0.0055 | 400 | 3.8 | 85.8 | 144.8 | 1.8 |
| 10 | 96–100 | 45 | 620 | C | 0.0065 | 375 | 4 | 86 | 145 | 1.8 | a One part of castor oil was dissolved in 60 parts of ethanol and the hydrogenation done in a shaking apparatus. The temperature was increased as the reaction rate dropped.
b Samples removed before finish of hydrogenation.
Catalysts:
A—5% Pd on charcoal.
B—1% Pd on charcoal.
C—Catalyst of Example 1.

changed. These products were obtained under extremely mild reaction conditions, which would effect an appreciable operating economy in commercial operation.

case each of the modified palladium catalysts gave less trans isomers in the product than did ordinary, unmodified palladium on carbon catalyst. Also, it is to be noted

*Table II*

HYDROGENATION OF COTTONSEED AND SOYBEAN OILS FOR MARGARINE OIL

| Experiment | Oil | Catalyst | Percent Pd in Oil | T, °C. | Pressure, p.s.i.g. | Agitation | Time, mins. | Hydrogenated Product | | | | | |
|---|---|---|---|---|---|---|---|---|---|---|---|---|---|
| | | | | | | | | I.N. | Wiley, M.P. | Congeal Point | Linoleic Acid | Saturated Acid | Trans Isomers |
| 1 | Cottonseed | 1% Pd on C | 0.0025 | 185 | 0 | High | 90 | 69 | 37.8 | 29.6 | 7.8 | 27 | 60.5 |
| 2 | do | 1% Pd on C, 1% HgCl₂ | 0.005 | 185 | 0 | do | 180 | 68 | 35.5 | 27.8 | 5.8 | 26.6 | 51.5 |
| 3 | do | 1% Pd on C, 5% AgAc | 0.005 | 185 | 0 | do | 330 | 69 | 34.0 | 25.0 | 3.6 | 24.6 | 37.7 |
| 4 | do | 1% Pd on C, 1% BiOAc | 0.0025 | 185 | 0 | do | 290 | 69 | 35.0 | 28.0 | 3.3 | 24.5 | 56.6 |
| 5 | do | 1% Pd on C, 8% Cu(OH)₂ | 0.005 | 185 | 0 | do | 150 | 69 | 36.0 | 27.5 | | | 32.3 |
| 6 | do | 1% Pd on C, 0.5% BiOAc, 0.8% AgAc | 0.0005 | 170 | 30 | do | 300 | 68 | 35.5 | 27.1 | 3.2 | 25.4 | 48.0 |
| 7 | Soybean | 1% Pd on C | 0.0001 | 180 | 40 | do | 60 | 81 | 39.0 | 24.5 | 13.0 | 17.0 | 48.0 |
| 8 | do | 1% Pd on C, 0.35% BiOAc, 0.8% AgAc | 0.0001 | 180 | 40 | do | 220 | 80 | 36.0 | 26.0 | 8.0 | 14.0 | 43.0 |

EXAMPLE VII

A number of catalysts consisting of palladium and modifying compounds were compared with ordinary palladium on carbon, in the hydrogenation of cottonseed oil and soybean oil for shortening stock and margarine oil. In the Tables II and III below, the reaction conditions that each melting point (Wiley) of products made with modified palladium catalysts is satisfactory; those made It will be noted from the data in Table II that in each with unmodified palladium catalysts are unsatisfactory. Furthermore, the modified catalysts displayed a greater selectivity in reducing linoleic acid; in each case the linoleic acid content is lower when a modified catalyst is used.

Table III
HYDROGENATION OF COTTONSEED AND SOYBEAN OILS FOR SHORTENING STOCK

| Experiment | Catalyst | Oil | T, °C. | Pressure, p.s.i.g. | Time, mins. | Hydrogenated Product | | | | | |
|---|---|---|---|---|---|---|---|---|---|---|---|
| | | | | | | I.N. | Wiley, M.P., °C. | Congeal Point, °C. | Linoleic Acid, percent | Saturated Acid, percent | Trans Isomers, percent |
| 9 | 1% Pd on C | Cottonseed | 80 | Atmos. | 255 | 63 | 40.5 | 31 | 3.0 | 31.3 | 54 |
| 10 | 1% Pd on C, 0.8 AgAc, 0.5% BiOAc | Cottonseed | 80 | Atmos. | 340 | 63.5 | 38.5 | 26.5 | 2.3 | 28.3 | 36 |
| 11 | 1% Pd on C, 0.5% AgAc, 0.35% BiOAc | Cottonseed, 30%; Soybean, 70%. | 50 | 15 | 120 | 70.1 | 41.0 | 27.4 | 5.8 | 24.5 | 25 |

Table III gives some examples of the use of modified palladium on carbon catalysts for the hydrogenation of natural oils to shortening stock. It is to be noted that the use of a modified palladium catalyst gives much less of the unwanted trans isomers than the unmodified palladium.

For both margarine oil and shortening stock, the best method of measuring plastic properties is by dilatation (Official Method of American Oil Chemists' Society—Cd-10-57). Some measurements of the products described in Tables II and III are given in Table IV.

Table IV
PLASTIC PROPERTIES OF HYDROGENATED OILS

| Experiment | Table | Solid Fat Index, °C. | | | |
|---|---|---|---|---|---|
| | | 21.1 | 26.1 | 36 | 42 |
| 9[a] | III | 44.0 | 38.0 | 17.1 | 1 |
| 10 | III | 25.7 | 19.0 | 4.8 | 0 |
| 11 | III | 14.9 | 12.4 | 5.1 | 1.1 |
| 1[a] | II | 48.0 | 41.0 | 12.0 | 0 |
| 6 | II | 26.0 | 18.0 | 3 | (b) |
| 7 | II | 17.5 | 11.2 | 2.9 | 1 |
| 8 | II | 19.0 | 13.0 | 1.8 | 0 |

[a] Unmodified palladium catalysts.
[b] Negative.

It can be seen from Table IV that the plastic properties of those products obtained with unmodified palladium are not nearly as satisfactory as those products obtained with a modified palladium catalyst.

It will be obvious to those skilled in the art that many modifications may be made within the scope of the present invention without departing from the spirit thereof, and the invention includes all such modifications.

What is claimed is:

1. A catalyst, effective for the selective hydrogenation of the olefinic linkages of unsaturated fatty oils, consisting essentially of a solid support and deposited thereon palladium metal and a modifying material selected from the group consisting of mercuric chloride, bismuth subacetate and a mixture of bismuth subacetate and silver acetate, the palladium metal being present in the range of .001 to 10 percent by weight and the modifying material being present in the range of .0005 to 10 percent by weight, the percentages being of total catalyst weight.

2. A catalyst according to claim 1 in which the support is carbon.

3. A catalyst according to claim 2 in which the modifying material is mercuric chloride.

4. A catalyst according to claim 2 in which the modifying material is bismuth subacetate.

5. A catalyst according to claim 2 in which the modifying material is a mixture of bismuth subacetate and silver acetate.

References Cited in the file of this patent

UNITED STATES PATENTS

| | | |
|---|---|---|
| 1,157,993 | McElroy | Oct. 26, 1915 |
| 1,189,817 | Hoehn | July 4, 1916 |
| 1,275,405 | Dewar et al. | Aug. 13, 1918 |
| 2,407,066 | Dunlop | Sept. 3, 1946 |
| 2,623,021 | Sweester et al. | Dec. 23, 1952 |
| 2,690,457 | Hackmann | Sept. 28, 1954 |
| 2,802,889 | Frevel et al. | Aug. 13, 1957 |
| 2,849,408 | Bente | Aug. 26, 1958 |
| 2,927,141 | Hohn | Mar. 1, 1960 |
| 2,967,835 | Hart | Jan. 10, 1961 |

FOREIGN PATENTS

| | | |
|---|---|---|
| 507,538 | Great Britain | June 16, 1939 |